(12) United States Patent
Small

(10) Patent No.: US 8,332,942 B2
(45) Date of Patent: Dec. 11, 2012

(54) FILE SYSTEM EVENT TRACKING

(75) Inventor: Brian Thomas Small, Winter Park, FL (US)

(73) Assignee: ScriptLogic Corporation, Boca Raton, FL (US)

( * ) Notice: Subject to any disclaimer, the term of this patent is extended or adjusted under 35 U.S.C. 154(b) by 0 days.

(21) Appl. No.: 12/878,609

(22) Filed: Sep. 9, 2010

(65) Prior Publication Data

US 2011/0010772 A1      Jan. 13, 2011

Related U.S. Application Data

(62) Division of application No. 11/535,317, filed on Sep. 26, 2006, now Pat. No. 7,818,801.

(51) Int. Cl.
G06F 11/00 (2006.01)
H04L 29/06 (2006.01)

(52) U.S. Cl. ............................. 726/22; 713/165
(58) Field of Classification Search ................ 726/22; 713/165
See application file for complete search history.

(56) References Cited

U.S. PATENT DOCUMENTS

| | | | | |
|---|---|---|---|---|
| 5,566,326 A | * | 10/1996 | Hirsch et al. | 703/26 |
| 5,796,825 A | * | 8/1998 | McDonnal et al. | 713/165 |
| 5,854,916 A | * | 12/1998 | Nachenberg | 703/21 |
| 7,484,245 B1 | * | 1/2009 | Friedman et al. | 726/27 |
| 7,917,481 B1 | * | 3/2011 | Kale et al. | 707/693 |
| 2006/0101282 A1 | * | 5/2006 | Costea et al. | 713/188 |
| 2006/0259487 A1 | * | 11/2006 | Havens et al. | 707/9 |
| 2007/0028303 A1 | * | 2/2007 | Brennan | 726/24 |
| 2007/0094491 A1 | * | 4/2007 | Teo et al. | 713/153 |

OTHER PUBLICATIONS

Burns, Randal, Zachary Peterson, Giuseppe Ateniese and Stephen Bono. "Verifiable Audit Trails for a Versioning File System." StorageSS'05: Alexandria, VA. Nov. 11, 2005. 7 pages.
"Change Auditing in a Layered Security Strategy: Providing the Essential Foundation for Data Network Security." Tripwire, Inc.: Portland, OR. 2001-2005. 12 pages.
"R-Guard Data Security Software: User Manual." R-Tools Technology, Inc. 2005. 51 pages.

* cited by examiner

*Primary Examiner* — Techane Gergiso
(74) *Attorney, Agent, or Firm* — Wong, Cabello, Lutsch, Rutherford & Brucculeri, L.L.P.

(57) ABSTRACT

Automated file system event tracking and reporting techniques are described in which file system events requested by a user application are intercepted and recorded prior to the request being permitted to pass to the file system for execution. Similarly, file system responses to a prior captured file system event are also intercepted and recorded. Predefined patterns of file system event may be aggregated and reported as a single event.

15 Claims, 3 Drawing Sheets

FILE SYSTEM EVENT TRACKING

CROSS REFERENCE TO RELATED APPLICATIONS

This is a divisional application of U.S. patent application Ser. No. 11/535,317 by Brian Small entitled "File System Event Tracking" filed 26 Sep. 2006 which is incorporated by reference herein in its entirety.

BACKGROUND

The invention relates generally to computer file systems and more particularly, but not by way of limitation, to methods and devices for recording or tracking file system events.

In the context of computer operating systems, a "file" may be defined as a named collection of data. Files are normally retained in storage devices such as magnetic disks (fixed, floppy, and removable), magnetic tape, optical media such as compact disks ("CDs") and digital video disks ("DVDs") and semiconductor memory devices such as electrically programmable read-only memory ("EPROM"), electrically erasable programmable read-only memory ("EEPROM"), programmable gate arrays and flash devices.

A "file system" is that portion of an operating system whose primary task is to manage the files retained on one or more storage devices. The file system is the means through which all files are manipulated (e.g., created, destroyed and modified). To aid in this task, file systems retain and/or obtain information about each file, so called "metadata." Illustrative file metadata include the file's user-specified name, a file identifier (for uniquely identifying the file to the file system), a pointer or reference to the file in non-volatile storage (or main memory), the user ID associated with the file's creation, the time at which the file was created, the user ID associated with the last modification to the file, the time the last modification to the file was made and security information. Illustrative security information includes which specified user group or groups (e.g., administrator, employees and executives) are permitted to read or modify the file. It will be recognized that some, or all, of this metadata may be retained within the file itself.

While prior art file system tracking applications provide some file event tracking capabilities, they do not compress or aggregate file operations for usability or track the user account making a change or detect, identify. Thus, it would be beneficial to provide methods, applications and systems that provide these capabilities.

SUMMARY

Automated file system event tracking and reporting techniques are described in which file system events requested by a user application are intercepted and recorded prior to the request being permitted to pass to the file system for execution. Similarly, file system responses to a prior captured file system event are also intercepted and recorded. Predefined patterns of file system event may be aggregated and reported as a single event.

DETAILED DESCRIPTION

Methods and devices to provide real-time tracking of file system events and event aggregation reporting are described. The following description is presented to enable any person skilled in the art to make and use the invention as claimed and is provided in the context of embodiments designed to operate in a Microsoft Windows® environment, variations of which will be readily apparent to those skilled in the art. (MICROSOFT WINDOWS is a registered trademark of the Microsoft Corporation.) Accordingly, the claims appended hereto are not intended to be limited by the disclosed embodiments, but are to be accorded their widest scope consistent with the principles and features disclosed herein.

Figure 1:
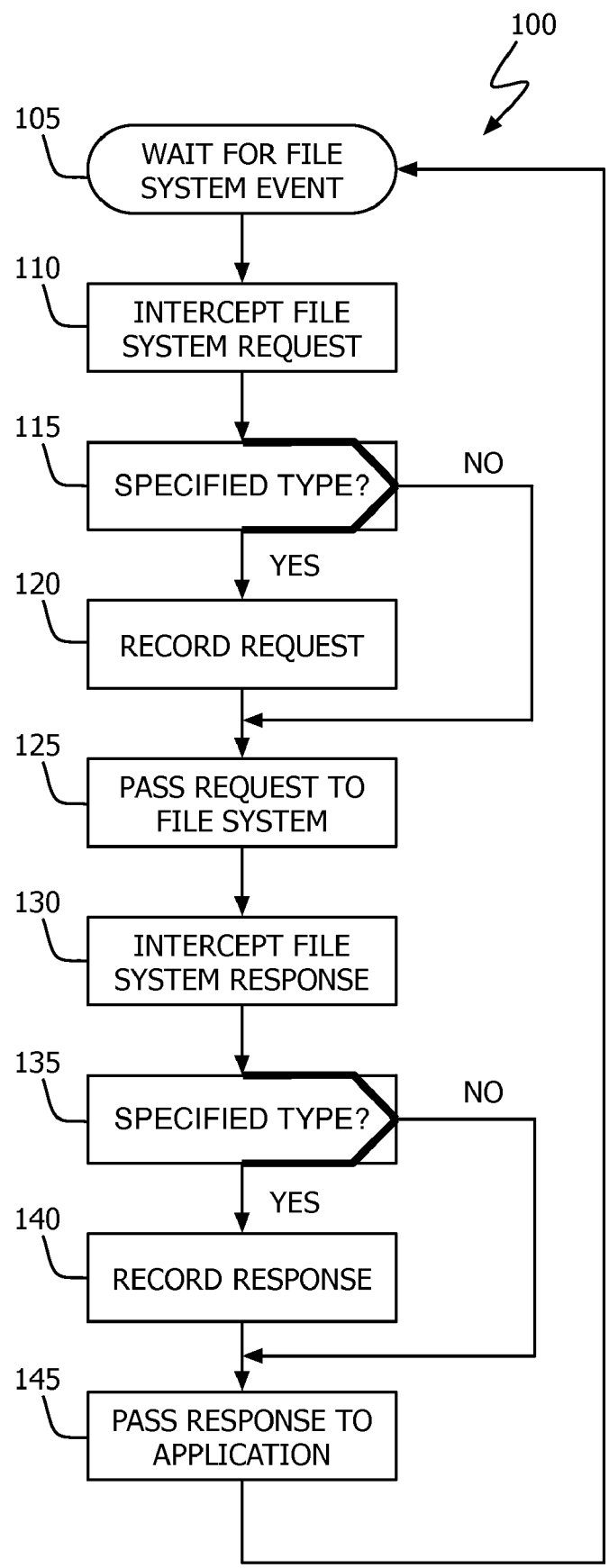
FIG. 1 shows, in flowchart format, a file tracking method in accordance with one embodiment of the invention.

Referring to FIG. 1, file tracking method 100 in accordance with one embodiment of the invention waits for a file system event to occur (block 105). User-level file system requests are intercepted (block 110) and checked to determine if the request is of a specified type (block 115). If the intercepted request is not of a type that has been specified to be tracked (the "No" prong of block 115), the request is passed to the file system (block 125). If the request is of a type specified to be tracked (the "Yes" prong of block 115), information about the request is recorded (block 120) and then allowed to pass to the file system (block 125). When the file system completes processing the event intercepted during the acts of block 110, its response is intercepted (block 130) and again checked to see if it is of a type specified to be tracked (block 135). If the intercepted response is not associated with a type of file system request that has been specified to be tracked (the "No" prong of block 135), the response is passed to the appropriate application (block 145)—that is, the application making the initial request. If the response is associated with file system request of a type specified to be tracked (the "Yes" prong of block 135), information about the response is recorded (block 140) and then passed to the application that made the initial request (block 145).

Types of file system activity that may be specified by a user include directory and file operations such as create, delete, move, rename, security change, access denied while creating and access denied while opening actions. In an embodiment designed to operate with the Microsoft Windows operating system, these events correspond to the following types of Microsoft defined file system events: IRP_MJ_CREATE; IRP_MJ_SET_INFORMATION; IRP_MJ_READ; IRP_MJ_WRITE; IRP_MJ_SET_SECURITY; IRP_MJ_CLEANUP; and IRP_MJ_CLOSE. In accordance with the invention, a user may specify that one or more of these file system actions be tracked on a per-file, per-directory, per-user group, per-process or per-user identification basis. In addition, all of one or more specified event types may also be tracked (regardless of file, directory, group, process or user identification). It will be recognized that file system event specification may be obtained from a user (e.g., a system administrator) through a graphical user interface ("GUI") prior to using tracking method 100. And, while the details of the graphical interface may vary from implementation to implementation, preparing such an interface would be well within the skill of one of ordinary skill in the art.

Referring to the acts of blocks 120 (recording file system request information) and 140 (recording file system response information), in one embodiment the following information is recorded: the time the event occurred; the user account identifier (e.g., the security identifier); they type of event (e.g., read, write, modify, create, delete, . . . ); the local path of the affected file object (e.g., a file or directory); the process identifier; the name of the computer system on which the event occurred; and security information. Security information includes both "before" and "after" values. As used herein, a before value corresponds to the security state of an object at the time the file system event request was intercepted in accordance with block 110. Similarly, an after value corresponds to the security state of an object at the time the file system event response was intercepted in accordance with block 130. For example, if a file system event were to change a directory from read/write access to read-only access, both of these security states would be recorded (one designated as the BEFORE state value and one designated as the AFTER state value). In another embodiment, the "difference" between the before and after security states may be recorded instead of separate before and after values. An advantage of this approach is that it provides a baseline to determine how a file system object's security state is changed over time. Accordingly, methods in accordance with the invention permit security change histories to be obtained even if tracking operations are interrupted (e.g., auditing is stopped for a period of time or an event is missed).

Figure 2:
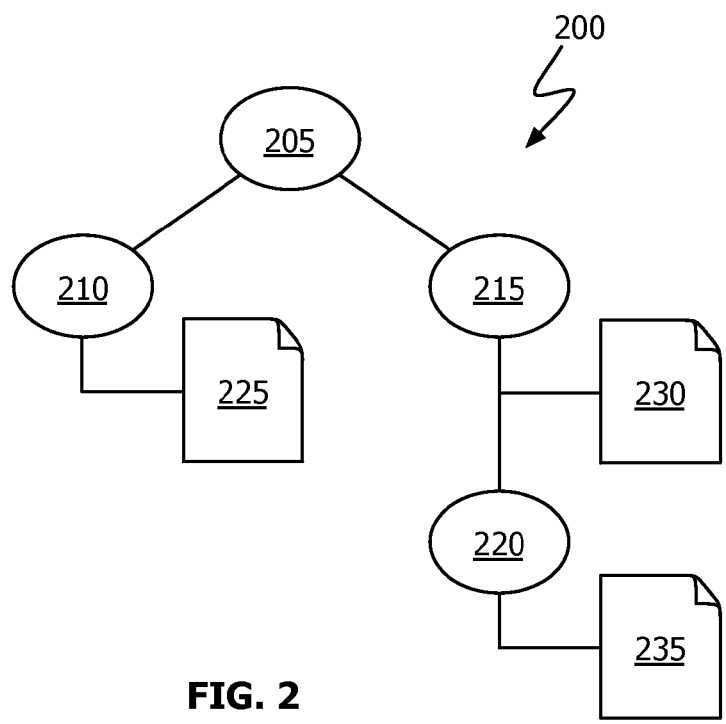
FIG. 2 shows a hierarchical directory structure.

In one embodiment both inherited and explicit security changes are tracked. When a security change to a specific file system object is made (e.g., a file or directory), this explicit change is noted and recorded. In addition, if a security change to one object is made (e.g., a directory), that effects the security of hierarchically related objects, these changes are also determined and recorded. By way of example, consider FIG. 2 which shows hierarchical directory structure 200 having root directory 205, child directories 210 and 215, where directory 215 itself has child directory 220. As shown, directory 210 includes file object 225, directory 215 includes file object 230 and directory 220 includes file object 235. Consider a user-specified (explicit) security change to file object 225. Such a change is noted and recorded in accordance with file tracking method 100. Now, consider an explicit security change event directed to directory 215. This (explicit) change would be noted and recorded in accordance with file tracking method 100 and, in addition, if the explicit security change modifies an access right to any hierarchically related object (e.g., directory object 220 and/or file objects 230 or 235), this change too is noted and recorded (i.e., an inherited security change).

Figure 3:
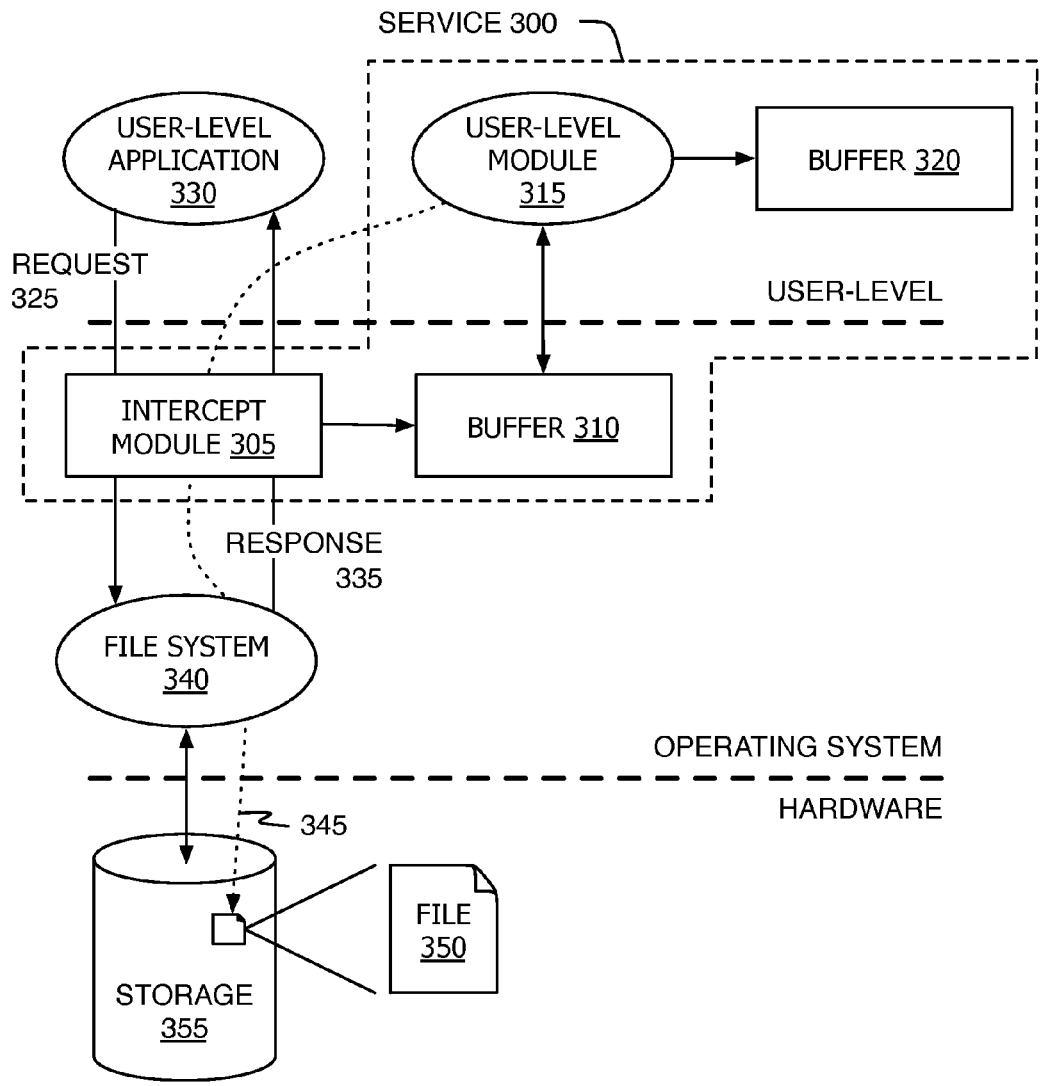
FIG. 3 shows, in block diagram format, a file system tracking service in accordance with one embodiment of the invention.

Referring to FIG. 3, tracking service 300 in accordance with one embodiment of the invention includes intercept module 305, buffer 310, user-level module 315 and buffer 320. In general, operating system or kernel-mode module 305 intercepts file system requests (e.g., request 325) form user-level applications (e.g., application 330) and files system responses (e.g., response 335) from file system 340. As previously noted, service 300 may be initialized prior to beginning event capture operations so that one or more file system events are specified for tracking. As used herein, a "service" is a collection of one or more code modules that do not require an active user session to execute.

More specifically, intercept module 305 watches all file activity on a given computer system such as, for example, a file server computer system. If an intercepted file system request is identified as being of a type designated for tracking, its information is temporarily stored in buffer 310 after which it is passed to file system 340. Similarly, intercept module 305 watches all file system responses and, if a response is detected that corresponds to a prior stored request, its information is also temporarily stored in buffer 310 after which it is passed to the application making the initial request (e.g., application 325). In one embodiment, user-level module 315 periodically polls buffer 310 to retrieve recently captured file system activity information. In another embodiment, intercept module 305 periodically notifies user-level module 315 that there is event information cached in its buffer 310. In still another embodiment, intercept module 305 causes the contents of buffer 310 to be periodically delivered to user-level module 315. Regardless of which embodiment is actually implemented, after the contents of buffer 310 is obtained by user-level module 315, intercept module 305 may reuse buffer 310.

For convenience, user-level module 315 stores file system event information obtained from module 315/buffer 310 in buffer 320. This approach permits a more rapid response to events coming "up" from kernel-mode module 305 and, in addition, provides additional time for user-level module 315 to process the collected information (see discussion below). Once buffer 320 fills or after user-level module 315 completes its processing, module 315 writes (identified by path 345) the captured and/or processed file system event information to an external file (e.g., file 350) on storage device 355. In one embodiment, file 350 is a database file (e.g., a SQL database file). In another embodiment, file 350 is a flat file. In still another embodiment, file 350 is a temporary file that may later be incorporated into an event database or other event log.

Another aspect of file tracking method 100 is that user-level module 315 may aggregate event information obtained from intercept module 305/buffer 310. In prior art file system tracking procedures, each individual file system event captured is reported. In contrast, file tracking methods in accordance with the invention may intelligently aggregate captured events to reduce the number of reported events while, at the same time, reporting more user-relevant events. By way of example, consider typical office automation programs such as Microsoft Access,® Excel,® Powerpoint® and Word applications. (MICROSOFT ACCESS, EXCEL and POWERPOINT are registered trademarks of the Microsoft Corporation.)

Figure 4:
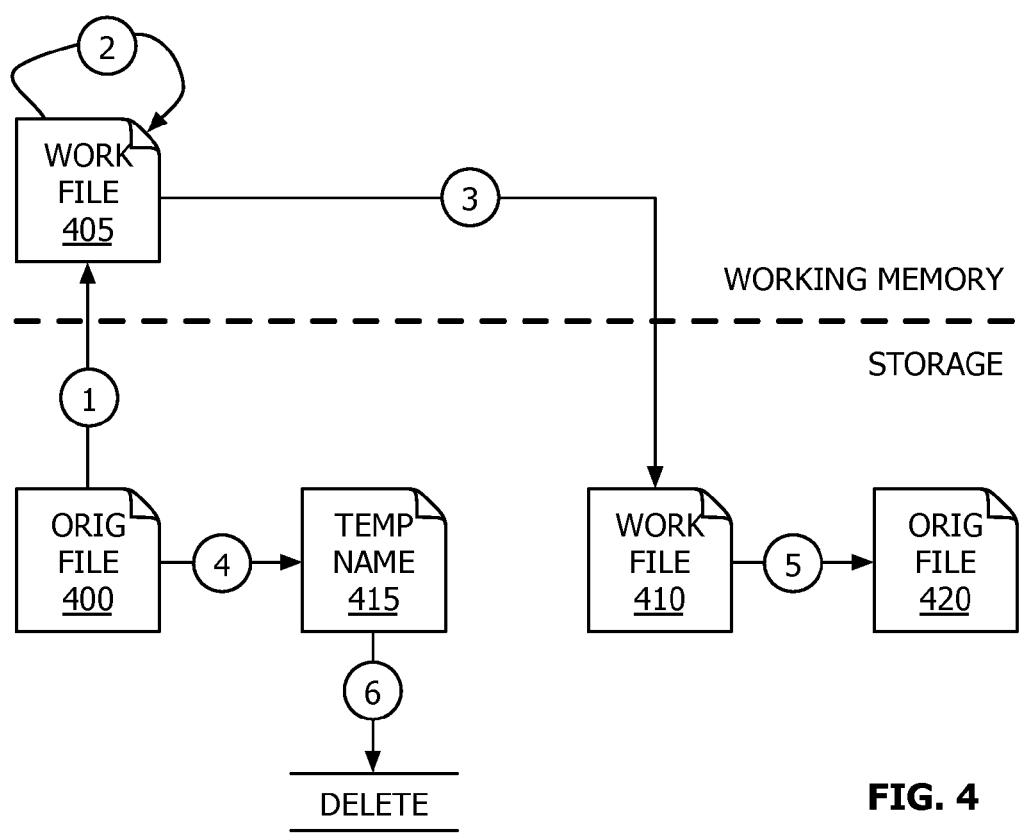
FIG. 4 shows typical file system events associated with file edit operations.

Referring to FIG. 4, in these and similar applications the file to be edited (e.g., original file 400) is copied into working memory from storage to create a working file such as, for example, work file 405 (action designated by ①). A user, through the application, may then edit working file 405 (action designated by ②). When either the program or user determines it is time to "save" the file being edited, work file 405 is written from working memory to storage into work file 410 (action designated by ③), original file 400 is renamed to file 415 (action designated by ④), work file 410 is renamed so that its name is the same as that of the original file, 420 (action designated by ⑤) and, finally, original file 400 is deleted (action designated by ⑥). In prior art file system tracking techniques, the described "save" operation would have generated 4 event records (actions ③, ④, ⑤ and ⑥). In contrast, file tracking method 100 detects this pattern of activity (file A→B, followed by file C→A, followed by deleting file B) and, if it occurs within a designated time period (e.g., between 0 and 3 seconds), records a single event: File Save.

Similar aggregation processing may occur with other user-designated file operations such as, for example, file moves (copy file A to a new location, followed by deleting original file A) and file copy operations. By way of example, a file open operation followed by one or more read operations into a specified memory (e.g., buffer memory) and a file create operation in which the information used to "populate" the new file comes from the same memory associated with the opened file can be recognized as a file copy operation—regardless of the amount of time the copy operation takes. Thus, in accordance with one embodiment of the invention a potentially large number of file system events (file open event+many, possibly thousands, of read events+file create event+many, possibly thousands, of write events where the read and write memory is common) may be conveniently collapsed or aggregated into a single event log: copy file A to file B by user C at time D. It will be recognized that such pattern recognition and event aggregation techniques are lacking form prior art file system tracking applications. It will be further recognized in light of the current description that such aggregation can eliminate up to 95% of the entries in a file system tracking log by virtue of thousands of read and/or write operations being associated with a single file operation (e.g., copy, move and rename).

One benefit of file tracking method 100 in accordance with the invention is that it can reduce the number of events logged (through aggregating events identified through the detection of predefined patterns of activity) which, in turn, provides improved readability of activity reports. Another benefit in accordance with the invention is that it allows file tracking to be administered on any level desired (user, process, file or directory). Yet another benefit of the invention is that user account information may be recorded. Still another benefit of the invention is that designated processes may be excluded for tracking. For example, it is known that virus monitoring software periodically reads substantially all files in a file system. If all such events were recorded the system administrator would be inundated with irrelevant activity (this is what prior art file system monitoring applications do). In accordance with the invention, however, specified activities (e.g., file read events) of a specified user or process may be excluded.

Various changes in the materials and components as well as in the details of the illustrated operational methods are possible without departing from the scope of the following claims. For instance, file tracking methods in accordance with the invention may be used in operational environments other than those running the Microsoft Windows operating system. In addition, not all of the information identified as being collected for a particular embodiment need be collected. In like manner, more information then described herein may be captured. In addition, while file tracking method 100 has been described as being a monolithic entity (e.g., service 300), it will be recognized that in practice it may comprise two or more separately executing threads. For example, a kernel thread may embody the functions described for intercept module 305 while a user thread may embody the functions ascribed to user-level module 315. Further, file tracking method 300 does not have to be implemented as a "service." That is, a file event tracking method and system in accordance with the invention may run as a standard executable. That is, requiring an active user session to acquire and collect file system event information.

Acts in accordance with FIGS. 1 and 4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A file system tracking method, comprising:
intercepting by a processor a file system security change request directed to a target file system object, the target file system object having a current security state, the security change request specifying a final security state;
recording the current security state in a memory;
communicating by the processor the security change request to a file system;
intercepting by the processor an indication that the security change request has been processed by the file system; and
recording the final security state in the memory,
wherein the target file system object is a file directory, the act of recording the current security state and the final security state further comprises recording a current security state and a final security state of a second file system object, wherein the second file system object is within the target file system object.

2. The method of claim 1, wherein the acts of intercepting are performed by a kernel-level application.

3. The method of claim 1, wherein the security change request comprises a IRP_MJ_SET_SECURITY request, wherein the IRP_MJ_SET_SECURITY request is a file system security change event request provided by a computer operating system.

4. The method of claim 1, wherein the act of recording the final security state comprises recording in the memory a single datum from which both the current security state and final security state may be derived.

5. The method of claim 1, wherein the act of recording the current security state comprises storing the current security state and an identifier identifying the second file system object in a kernel memory.

6. The method of claim 5, wherein the act of recording the final security state comprises associating the final security state with the current security state in the kernel memory.

7. The method of claim 6, further comprising:
retrieving, by the processor, the current security state, the target security state and the identifier identifying the target file system object from the kernel buffer memory; and
storing the current security state, the target security state and the identifier identifying the target file system object in a database.

8. The method of claim 7, wherein the act of retrieving and storing is performed by a user-level application.

9. The method of claim 1, wherein the act of recording the current security state and the final security state further comprises recording a time associated with the intercepted file system security change request.

10. The method of claim 1, wherein the act of recording the current security state and the final security state further comprises recording a user account identifier associated with the security change request.

11. The method of claim 1, wherein the act of recording the current security state and the final security state further comprises recording a process identifier associated with the security change request.

12. The method of claim 1, wherein the act of recording the current security state and the final security state further comprises recording a computer system identifier on which the target file system object is stored.

13. The method of claim 1, wherein the act of recording the current security state and the final security state further comprises recording a path associated with the target file system object.

14. The method of claim 1, wherein the second file system object is a file directory.

15. A program storage device, readable by a programmable control device, comprising instructions stored on the program storage device for causing the programmable control device to perform the method of claim 1.

* * * * *